United States Patent
Park et al.

(10) Patent No.: US 12,113,209 B2
(45) Date of Patent: Oct. 8, 2024

(54) NEGATIVE ELECTRODE ACTIVE MATERIAL WITH METAL DOPANT, AND NEGATIVE ELECTRODE, AND LITHIUM SECONDARY BATTERY INCLUDING THE SAME

(71) Applicant: LG ENERGY SOLUTION LTD., Seoul (KR)

(72) Inventors: Se Mi Park, Daejeon (KR); Yong Ju Lee, Daejeon (KR); Dong Hyuk Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 821 days.

(21) Appl. No.: 17/265,605

(22) PCT Filed: Aug. 23, 2019

(86) PCT No.: PCT/KR2019/010798
§ 371 (c)(1),
(2) Date: Feb. 3, 2021

(87) PCT Pub. No.: WO2020/040613
PCT Pub. Date: Feb. 27, 2020

(65) Prior Publication Data
US 2021/0167369 A1 Jun. 3, 2021

(30) Foreign Application Priority Data
Aug. 23, 2018 (KR) .................. 10-2018-0098724

(51) Int. Cl.
*H01M 4/36* (2006.01)
*H01M 4/02* (2006.01)
*H01M 4/04* (2006.01)
*H01M 4/133* (2010.01)
*H01M 4/1393* (2010.01)
*H01M 4/38* (2006.01)
*H01M 4/48* (2010.01)
*H01M 4/587* (2010.01)
*H01M 10/0525* (2010.01)

(52) U.S. Cl.
CPC ......... *H01M 4/366* (2013.01); *H01M 4/0459* (2013.01); *H01M 4/364* (2013.01); *H01M 4/386* (2013.01); *H01M 4/483* (2013.01); *H01M 4/587* (2013.01); *H01M 10/0525* (2013.01); *H01M 2004/027* (2013.01); *H01M 4/0471* (2013.01); *H01M 4/133* (2013.01); *H01M 4/1393* (2013.01)

(58) Field of Classification Search
CPC .... H01M 4/366; H01M 4/0459; H01M 4/364; H01M 4/386; H01M 4/483; H01M 4/587; H01M 4/0471; H01M 4/133; H01M 4/1393; H01M 10/0525; H01M 2004/027
See application file for complete search history.

(56) References Cited

U.S. PATENT DOCUMENTS

| | | | |
|---|---|---|---|
| 6,200,697 B1 | 3/2001 | Pesavento |
| 2005/0233213 A1 | 10/2005 | Lee et al. |
| 2007/0077490 A1 | 4/2007 | Kim et al. |
| 2012/0007028 A1 | 1/2012 | Hwang et al. |
| 2014/0234535 A1 | 8/2014 | Lee et al. |
| 2016/0036049 A1 | 2/2016 | Wang et al. |
| 2016/0190571 A1 | 6/2016 | Lee et al. |
| 2017/0104211 A1 | 4/2017 | Tanaka et al. |
| 2017/0187032 A1 | 6/2017 | Chang et al. |
| 2017/0214042 A1 | 7/2017 | Cho et al. |
| 2017/0352883 A1 | 12/2017 | Cho et al. |
| 2018/0342757 A1 | 11/2018 | Choi et al. |
| 2019/0051894 A1 | 2/2019 | Xia et al. |
| 2019/0115586 A1 | 4/2019 | Kamo et al. |
| 2021/0351432 A1 | 11/2021 | Choi et al. |

FOREIGN PATENT DOCUMENTS

| | | |
|---|---|---|
| CN | 1667855 A | 9/2005 |
| CN | 1937288 A | 3/2007 |
| CN | 102792498 A | 11/2012 |
| CN | 103500827 A | 1/2014 |
| CN | 105958036 A | 9/2016 |
| CN | 106129411 A | 11/2016 |
| CN | 107302082 A | 10/2017 |
| CN | 107658448 A | 2/2018 |
| CN | 108023074 A | 5/2018 |
| CN | 108292745 A | 7/2018 |
| CN | 108336311 A | 7/2018 |
| CN | 108400293 A | 8/2018 |
| EP | 3343677 A1 | 7/2018 |
| JP | 2016-048628 A | 4/2016 |
| JP | 2018-032602 A | 3/2018 |

(Continued)

OTHER PUBLICATIONS

EPO machine generated English translation of KR 2014-0120751 A (Year: 2014).*
International Search Report (with partial translation) and Written Opinion dated Nov. 28, 2019, issued in corresponding International Patent Application No. PCT/KR2019/010798.
Office Action issued in Chinese application 201980050850.3 dated Jun. 30, 2023.
"A Basic Guide to Particle Characterization," Inform White Paper, Malvern Instruments Worldwide, pp. 1-26 (2012), XP055089322.
Yang et al., "SiOx-based anodes for secondary lithium batteries," Solid State Ionics, vol. 152-153, pp. 125-129 (2002), XP055754529.
Extended European Search Report issued in corresponding European Patent Application No. 19851988.6 dated Sep. 16, 2021.

(Continued)

*Primary Examiner* — Christopher P Domone
*Assistant Examiner* — Kimberly Wyluda
(74) *Attorney, Agent, or Firm* — Bryan Cave Leighton Paisner LLP

(57) ABSTRACT

The present invention relates to a negative electrode active material including a silicon-based core, a first coating layer positioned on the silicon-based core, and a second coating layer positioned on the first coating layer, wherein the second coating layer includes a metal material doped onto a surface thereof.

12 Claims, No Drawings

(56) References Cited

FOREIGN PATENT DOCUMENTS

| KR | 10-2005-0090218 A | 9/2005 |
| KR | 10-2005-0090219 A | 9/2005 |
| KR | 10-2013-0016727 A | 2/2013 |
| KR | 10-2014-0120751 A | 10/2014 |
| KR | 10-1614016 B1 | 4/2016 |
| KR | 10-2016-0085386 A | 7/2016 |
| KR | 10-2016-0143839 A | 12/2016 |
| KR | 10-2017-0048295 A | 5/2017 |
| KR | 10-2017-0078203 A | 7/2017 |
| KR | 2017-0137000 A | 12/2017 |
| KR | 10-2018-0029723 A | 3/2018 |
| WO | 2017/179457 A1 | 10/2017 |

OTHER PUBLICATIONS

Zhaohua Jiang, et al., "Principle of physical chemistry of solid interface and application thereof", Publishing house of Harbin Institute of Technology, pp. 1-3, Jan. 31, 2017.

\* cited by examiner

NEGATIVE ELECTRODE ACTIVE MATERIAL WITH METAL DOPANT, AND NEGATIVE ELECTRODE, AND LITHIUM SECONDARY BATTERY INCLUDING THE SAME

CROSS-REFERENCE TO RELATED APPLICATION

This application claims priority to and the benefit of Korean Patent Application No. 10-2018-0098724, filed on Aug. 23, 2018, the disclosure of which is incorporated herein by reference in its entirety.

TECHNICAL FIELD

The present invention relates to a negative electrode active material, and a negative electrode and a lithium secondary battery including the same, and more specifically, to a negative electrode active material including a silicon core, a first coating layer, and a second coating layer, and a negative electrode and a lithium secondary battery including the same.

BACKGROUND ART

As the technical development of and the demand on mobile devices increase, the demand for secondary batteries as energy sources is rapidly increasing, and among these secondary batteries, lithium secondary batteries that have high energy density, a high operating voltage, a long cycle lifespan, and a low self-discharge rate are commercially available and widely used.

A lithium secondary battery is a secondary battery that generally consists of a positive electrode including a positive electrode active material, a negative electrode including a negative electrode active material, a separator, and an electrolyte and charges and discharges by the intercalation-deintercalation of lithium ions. The lithium secondary battery has a high energy density, a high electromotive force, and high capacity and thus is applied to various fields.

Meanwhile, a metal oxide such as $LiCoO_2$, $LiMnO_2$, $LiMn_2O_4$, or $LiCrO_2$ is used as a positive electrode active material constituting a positive electrode of a lithium secondary battery, and a material such as metal lithium, a carbon-based material such as graphite or activated carbon, or silicon oxide ($SiO_x$) is used as a negative electrode active material constituting a negative electrode. Among the materials used as the negative electrode active material, metal lithium was mainly used initially, but as the charge and discharge cycles progress, lithium atoms grow on the surface of the metal lithium to damage a separator and damage a battery, and thus, recently, a carbon-based material is generally used. However, since the carbon-based material has a disadvantage in that a theoretical capacity is only about 400 mAh/g and thus capacity is small.

Accordingly, various studies have been made to replace the carbon-based material with a silicon (Si)-based material having a high theoretical capacity (4,200 mAh/g) as the negative electrode active material. A reaction scheme where lithium is intercalated into silicon is as follows.

$$22Li+5Si=Li_{22}Si_5 \quad \text{[Reaction Scheme 1]}$$

However, in most silicon negative electrode materials, a silicon volume expands up to 300% due to lithium intercalation, and thus a negative electrode is damaged and does not exhibit high cycle characteristics. In addition, in the case of silicon, as cycles continue, the volume expansion occurs due to the lithium intercalation, and fading mechanisms such as pulverization, contact losses between conducting agents and a current collector, and unstable solid-electrolyte solution-interphase (SEI) formation may be exhibited.

Accordingly, to solve the above-described problems, studies using a silicon nanostructure whose structure is controlled, for example, formation of a complex with a nanowire, a nanotube, a nanoparticle, a porous structure, and a carbon-based material have been reported. As an example, although a carbon-coated silicon nanostructure has been studied, the capacity of the negative electrode active material was not retained as charging/discharging cycles for a lithium secondary battery using the carbon-coated silicon nanostructure as a negative electrode active material were repeated. In addition, when carbon is coated on the silicon-based particles through a chemical vapor deposition (CVD) method or the like, specific surface area is increased, and thus a side reaction with an electrolyte solution increases, resulting in deterioration of cycle characteristics.

Accordingly, there is still a demand for the development of a silicon-based negative electrode active material that may solve conventional problems caused by the use of silicon, and a negative electrode and a lithium secondary battery including the same.

PRIOR ART DOCUMENT

Patent Document

Korean Patent Publication No. 2017-0078203 A

DISCLOSURE

Technical Problem

The present invention is directed to providing a negative electrode active material capable of capable reducing volume expansion caused by the intercalation of lithium ions to improve the performance of a lithium secondary battery, and solving a problem of side reactions with an electrolyte solution, which is caused by the large specific surface area in a conventional silicon-based negative electrode active material in which a carbon coating layer is formed.

The present invention is also directed to providing a negative electrode for a lithium secondary battery and a lithium secondary battery that include the above-described negative electrode active material.

The present invention is also directed to providing a method of preparing the above-described negative electrode active material.

Technical Solution

One aspect of the present invention provides a negative electrode active material including a silicon-based core, a first coating layer positioned on the silicon-based core, and a second coating layer positioned on the first coating layer, and the second coating layer includes a metal material doped onto a surface thereof.

Another aspect of the present invention provides a negative electrode for a lithium secondary battery including the negative electrode active material, and a lithium secondary battery including the negative electrode for a lithium secondary battery.

Still another aspect of the present invention provides a method of preparing the negative electrode active material, the method including (1) forming a first coating layer on a silicon-based core, (2) coating a polymer on the first coating layer to form a polymer layer and carbonizing the polymer layer to form a second coating layer, and (3) doping the surface of the second coating layer with a metal material.

Advantageous Effects

A negative electrode active material of the present invention can reduce the volume expansion of a silicon-based core caused by the intercalation of lithium ions, and can solve a problem associated with the increase in specific surface area generated when a carbon coating layer is formed on a silicon-based core, thereby further improving the performance of a lithium secondary battery such as high lifespan characteristics. Accordingly, the negative electrode active material of the present invention can be usefully used in the manufacture of a lithium secondary battery including the same.

MODES OF THE INVENTION

Hereinafter, the present invention will be described in detail in order to facilitate understanding of the present invention.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

A negative electrode active material of the present invention includes a silicon-based core, a first coating layer positioned on the silicon-based core, and a second coating layer positioned on the first coating layer, and the second coating layer includes a metal material doped onto the surface thereof.

The silicon-based core may include one or more selected from the group consisting of Si, a silicon oxide particle (SiO$_x$, 0≤x<2), and a mixture thereof, and the silicon oxide particle (SiO$_x$, 0≤x<2) may be a composite composed of amorphous Sift and crystalline Si.

The silicon-based core may include one or more doping metals selected from the group consisting of Li, Mg, Ca, Al, Ti, and Na, and when the silicon-based core includes the doping metal, the doping metal may be included in the silicon-based core as a metal compound including a metal oxide, a metal silicate, or both thereof.

The silicon-based core may be silicon-based particles formed as one mass, and alternatively, silicon-based secondary particles formed by aggregating silicon-based primary particles having a small particle size, or may be particles including both types thereof.

An average particle size (D$_{50}$) of the silicon-based core may be in a range of 0.01 μm to 30 μm, specifically 0.1 μm to 15 μm, and may be included in an amount of 30 parts by weight to 99 parts by weight, specifically 70 parts by weight to 99 parts by weight based on 100 parts by weight of the negative electrode active material.

The first coating layer is formed on the silicon-based core, and specifically, may be formed on the outer surface of the silicon-based core.

The first coating layer is formed on the silicon-based core to prevent or alleviate the pulverization of the silicon-based core or to effectively prevent or alleviate a side reaction between the silicon-based core and an electrolyte when the volume of the silicon-based core is changed due to the intercalation and deintercalation of lithium. In addition, the silicon-based core has low electrical conductivity, and thus, the first coating layer may enable the silicon-based core to have excellent conductivity so that the negative electrode active material easily reacts with lithium.

The first coating layer may include one or more selected from the group consisting of amorphous carbon, natural graphite, artificial graphite, activated carbon, mesocarbon microbeads (MCMB), carbon fiber, and a carbon-based material made by heat-treating coal tar pitch, petroleum pitch, and an organic material as raw materials, and specifically, one or more selected from the group consisting of amorphous carbon, natural graphite, artificial graphite, and activated carbon.

A thickness of the first coating layer may be in a range of 5 nm to 100 nm, and specifically 10 nm to 100 nm.

When the thickness of the first coating layer satisfies the above-described range, the pulverization of the silicon-based core may be suitably prevented or alleviated according to the volume change of the silicon-based core, a side reaction of the silicon-based core with an electrolyte solution may be prevented, and the intercalation and deintercalation of lithium may be prevented from being interfered with by the first coating layer.

The first coating layer may be included in an amount of 0.1 parts by weight to 50 parts by weight, specifically, 1 part by weight to 10 parts by weight, and more specifically, 1.5 parts by weight to 6 parts by weight based on 100 parts by weight of the negative electrode active material. The content of the first coating layer is related to the thickness of the first coating layer. Accordingly, when the content of the first coating layer satisfies the above-described range, the pulverization of the silicon-based core may be suitably prevented or alleviated according to the volume change of the silicon-based core, a side reaction of the silicon-based core with an electrolyte solution may be prevented, and the ratio of the first coating layer in the negative electrode active material may be adjusted to an appropriate degree to prevent the intercalation and deintercalation of lithium from being interfered with.

As described above, the first coating layer may serve to prevent the silicon-based core from causing the side reaction with the electrolyte solution while preventing or alleviating the silicon-based core from being pulverized in response to the volume change of the silicon-based core. However, the first coating layer positioned on the silicon-based core may have a large specific surface area during the formation process thereof and thus may cause the side reaction with the electrolyte solution. Accordingly, in order to solve the problem due to the large specific surface area of the first coating layer, the negative electrode active material of the present invention includes the second coating layer positioned on the first coating layer.

The second coating layer is formed on the first coating layer, and specifically, may be formed on the other surface of the first coating layer that is a surface opposite the surface of the first coating layer in contact with the silicon-based core, that is, on the outer surface of the first coating layer. The first coating layer and the second coating layer may be formed of different materials or by different methods and thus an interface, in which the first coating layer and the second coating layer may be distinguished from each other, may be present therebeween.

The second coating layer has a smoother surface than the first coating layer and is formed on the first coating layer to reduce a side reaction with an electrolyte solution due to the large specific surface area of the first coating layer, thereby improving the cycle characteristics of the negative electrode active material. In addition, the second coating layer may help to maintain the physical bonding between the silicon-based core and the first coating layer to accommodate the volume change of the silicon-based core while suppressing the deintercalation of the first coating layer caused by the volume change of the silicon-based core when the volume of the silicon-based core is changed due to the intercalation and deintercalation of lithium. In particular, since the second coating layer includes a metal material doped onto the surface thereof, the metal material may impart high conductivity to the negative electrode active material so that the conductivity of the negative electrode active material is further improved.

The second coating layer may be formed by forming a polymer layer on the first coating layer, followed by carbonizing. The metal material may be doped before or after carbonizing the polymer layer, and specifically, may be included on the surface of the second coating layer by doping a carbon surface with the metal material after the polymer layer is carbonized.

The polymer is not particularly limited, but may include, for example, one or more selected from the group consisting of polyethylene oxide, polyvinyl pyrrolidone, polyacrylic acid, polyvinyl alcohol, polyethyleneimine, polyacetylene, polyparaphenylene, polypyrrole, polyaniline, polyacrylonitrile, urethane, polythiophene, polyurea, and polythiophene, and specifically, one or more selected from the group consisting of polyacrylonitrile, polyvinylpyrrolidone, polyethyleneimine, polypyrrole, polyaniline, urethane, polythiophene, polyurea, and polythiophene that are polymers including one or more elements of N and S in a molecule. These may be used in combination with appropriate solvents.

The second coating layer may be formed by carbonizing a monolayer film of a polymer, or a multilayer film in which two or more coating films are stacked.

A thickness of the second coating layer may be in a range of 5 nm to 100 nm, and specifically 10 nm to 100 nm.

When the thickness of the second coating layer satisfies the above-described range, it is possible to help the physical bonding between the silicon-based core and the first coating layer while appropriately reducing the influence of the specific surface area of the first coating layer, and to prevent the intercalation and deintercalation of lithium from being interfered with by the second coating layer while appropriately accommodating the volume change of the silicon-based core due to the intercalation and deintercalation of lithium.

The second coating layer may be included in an amount of 0.1 parts by weight to 50 parts by weight, specifically, 1 part by weight to 10 parts by weight, and more specifically, 2 parts by weight to 7 parts by weight based on 100 parts by weight of the negative electrode active material. The content of the second coating layer is related to the thickness of the second coating layer. Accordingly, when the content of the second coating layer satisfies the above-described range, the effect of limiting the thickness of the second coating layer as described above may be properly exhibited.

The metal material may be positioned on the surface of the second coating layer, and specifically, on the other surface of the second coating layer that is a surface opposite the surface of the second coating layer in contact with the first coating layer. That is, the metal material may be positioned on the outer surface of the negative electrode active material, and may help to improve the electrical conductivity of the negative electrode active material.

The metal material may be one or more selected from the group consisting of Li, Mg, Ca, Al, Ti, and Na, and specifically, may be one or more selected from the group consisting of Li, Mg, and Ca. When the second coating layer includes the metal material on the surface thereof, the electrical conductivity of the negative electrode active material increases to reduce the resistance of the negative electrode including the metal material, and the control of the volume change of the negative electrode active material may be more effectively performed during charging and discharging of the battery, thereby effectively improving battery performance.

The metal material may be included in an amount of 0.01 parts by weight to 5 parts by weight and specifically 0.05 parts by weight to 3 parts by weight based on 100 parts by weight of the negative electrode active material, and the above range is preferable in terms of more easily controlling the volume change of the negative electrode active material and improving the electrical conductivity of the negative electrode active material.

The negative electrode active material may have an average particle size ($D_{50}$) of 0.05 µm to 40 µm, specifically 0.05 µm to 20 µm, and more specifically 1 µm to 10 µm.

When the average particle size of the negative electrode active material is 0.05 µm or more, the density of the electrode may be prevented from being lowered to have an appropriate capacity per volume, and when the average particle size of the negative electrode active material is 40 µm or less, the slurry for forming the electrode may be appropriately coated with a uniform thickness.

In the present invention, the average particle size ($D_{50}$) of each of the silicon-based core and the silicon oxide-carbon-polymer composite may be defined as a particle size at 50% of a particle size distribution. The average particle size may be measured using, for example, a laser diffraction method or a scanning electron microscope (SEM) image without being limited thereto. The laser diffraction method may be used to measure a particle size in the range from submicrons to several millimeters and may obtain results with high reproducibility and high resolution.

According to one embodiment of the present invention, the negative electrode active material may be prepared by a preparation method including, for example, (1) forming a first coating layer on a silicon-based core, (2) coating a polymer on the first coating layer to form a polymer layer and carbonizing the polymer layer to form a second coating layer, and (3) doping the surface of the second coating layer with a metal material.

(1) The forming of the first coating layer on the silicon-based core, may be achieved by growing carbon on the silicon-based core and forming a composite, for example, the first coating layer may be formed by coating one or more selected from the group consisting of amorphous carbon, natural graphite, artificial graphite, activated carbon, mesocarbon microbeads (MCMB), carbon fiber, and a carbon-based material made by heat-treating coal tar pitch, petroleum pitch, and an organic material as raw materials on the silicon-based core using a chemical vapor deposition (CVD) method, a coating method using pitch, a solvent evaporation method, a co-precipitation method, a precipitation method, a sol-gel method, or a sputtering method, and specifically, the first coating layer may be formed by depositing a carbon-based material made by heat-treating an organic material as a raw material using a CVD method.

The organic material may be at least one selected from the group consisting of methane, ethane, ethylene, butane, acetylene, carbon monoxide, propane, and propylene, and specifically, methane.

(2) The coating of a polymer on the first coating layer to form a polymer layer and carbonizing the polymer layer to form a second coating layer may be achieved by coating a polymer material forming the second coating layer on the first coating layer followed by carbonizing.

The polymer is not particularly limited, but may include, for example, one or more selected from the group consisting of polyethylene oxide, polyvinyl pyrrolidone, polyacrylic acid, polyvinyl alcohol, polyethyleneimine, polyacetylene, polyparaphenylene, polypyrrole, polyaniline, polyacrylonitrile, urethane, polythiophene, polyurea, and polythiophene, and specifically, one or more selected from the group consisting of polyacrylonitrile, polyvinylpyrrolidone, polyethyleneimine, polypyrrole, polyaniline, urethane, polythiophene, polyurea, and polythiophene that are polymers including one or more elements of N and S in a molecule. These may be used in combination with a suitable solvent, which may be coated using a CVD method, a solvent evaporation method, a co-precipitation method, a precipitation method, a sol-gel method, or a sputtering method and carbonized through heat treatment to form the second coating layer.

The carbonization in the operation (2) may be performed at a temperature of 600° C. to 800° C. for 2 to 6 hours.

(3) The doping of the surface of the second coating layer with a metal material may be achieved by mixing the product of the operation (2) with a compound including at least one element selected from the group consisting of Li, Mg, Ca, Al, Ti, and Na and then reacting the compound at a high temperature of about 400° C. to 800° C. Although not particularly limited, when Li is doped, examples of the compound including Li may include lithium acetylacetonate ($LiO_2C_5H_7$), lithium carbonate ($Li_2CO_3$), lithium sulfide (LiS), lithium hydride (LiH), lithium dimethylamide ($C_2H_6LiN$), lithium acetoacetate ($LiO_3C_4H_5$), lithium oxide ($Li_2O$), lithium metal, and the like.

The negative electrode active material according to one embodiment of the present invention may be used as a negative electrode active material alone or may be used as a negative electrode active material by being mixed with carbon and/or a material that may be alloyed with lithium. The material that may be alloyed with lithium may be one or more selected from the group consisting of Si, SiOx, Sn, SnOx, Ge, GeOx, Pb, PbOx, Ag, Mg, Zn, ZnOx, Ga, In, Sb, and Bi.

Further, the present invention provides a negative electrode for a lithium secondary battery including the negative electrode active material, and provides a lithium secondary battery including the negative electrode.

The lithium secondary battery may include a positive electrode, a negative electrode, and a separator interposed between the positive electrode and the negative electrode.

The negative electrode may be manufactured by a conventional method known in the art, for example, by preparing a slurry for a negative electrode active material by mixing and stirring the negative electrode active material and additives such as a binder and a conducting agent, and coating and drying a negative electrode current collector with the slurry, followed by pressing.

The binder may be used to maintain a molded body by cohesion of particles of the negative electrode active material, and the binder is no particularly limited as long as it is a conventional binder used in the preparation of a slurry for a negative electrode active material. For example, a non-aqueous binder such as polyvinyl alcohol, carboxymethylcellulose, hydroxypropylenecellulose, diacetylcellulose, polyvinyl chloride, polyvinylpyrrolidone, polytetrafluoroethylene (PTFE), polyvinylidene fluoride (PVdF), polyethylene or polypropylene may be used, and alternatively, an aqueous binder such as one or a mixture of two or more selected from the group consisting of acrylonitrile-butadiene rubber, styrene-butadiene rubber and acrylic rubber may be used. Since the aqueous binder is economical, environmentally-friendly, harmless to a worker's health, and has a better cohesive effect, compared with the non-aqueous binder, a proportion of the active material per the same volume may be increased, and therefore, it is possible to exhibit higher capacity. As an aqueous binder, specifically, styrene-butadiene rubber may be used.

The binder may be included in an amount of 10 wt % or less, and specifically in a range of 0.1 wt % to 10 wt % based on the total weight of the slurry for a negative electrode active material. When the content of the binder is less than 0.1 wt %, the effect according to the use of a binder is insignificant, which is not preferable, and when the content of the binder is more than 10 wt %, it is not preferable because the capacity per volume may be reduced due to a decrease in relative content of an active material, caused by an increase in binder content.

The conducting agent is not particularly limited as long as it has conductivity without causing chemical changes in the battery, and for example, graphite such as natural graphite or artificial graphite; a carbon black type such as acetylene black, Ketjen black, channel black, furnace black, lamp black or thermal black; a conductive fiber such as a carbon fiber or a metal fiber; a metal powder such as fluorocarbon powder, aluminum powder or nickel powder; a conductive whisker consisting of zinc oxide or potassium titanate; a conductive metal oxide such as titanium oxide; or a conductive material such as a polyphenylene derivative may be used. The conducting agent may be used in an amount of 1 wt % to 9 wt % based on the total weight of the slurry for a negative electrode active material.

The negative electrode current collector used in the negative electrode according to one embodiment of the present invention may have a thickness of 3 μm to 500 μm. The negative electrode current collector is not particularly limited as long as it has conductivity without causing chemical changes in the battery, and may be made of, for example, copper, gold, stainless steel, aluminum, nickel, titanium, or calcined carbon; copper or stainless steel whose surface is treated with carbon, nickel, titanium, or silver, an aluminum-cadmium alloy; or the like. In addition, the negative electrode current collector may have fine irregularities at a surface thereof to increase the binding force of the negative electrode active material, and may be used in various forms such as a film, a sheet, a foil, a net, a porous body, a foamed body, non-woven fabric, and the like.

The positive electrode may be manufactured by a conventional method known in the art. For example, the positive electrode may be manufactured by preparing a slurry by mixing a positive electrode active material with a solvent, and as necessary, a binder, a conducting agent, or a dispersing agent, applying (coating) the slurry onto a current collector formed of a metal material, and pressing and drying the coated current collector.

The current collector made of a metal material is a metal which has high conductivity and to which the slurry of the positive electrode active material may be easily adhered. Any material may be used without limitation as a material of the current collector as long as the material has high conductivity without causing a chemical change in the battery in a voltage range of the battery. For example, stainless steel, aluminum, nickel, titanium, baked carbon, or aluminum or stainless steel whose surface is treated with carbon, nickel, titanium, or silver may be used. In addition, fine irregularities may be formed on a surface of the current collector to increase the adhesion of the positive electrode active material. The current collector may be used in various forms such as a film, a sheet, a foil, a net, a porous body, a foam, and a nonwoven fabric and may have a thickness in the range of 3 μm to 500 μm.

The positive electrode active material may be, for example, a layered compound or a compound substituted with one or more transition metals selected from the group consisting of a lithium cobalt oxide ($LiCoO_2$), a lithium nickel oxide ($LiNiO_2$); $Li[Ni_aCo_bMn_cM^1_d]O_2$ (where $M^1$ is any one or two or more elements selected from the group consisting of Al, Ga and In, $0.3 \le a \le 1.0$, $0 \le b \le 0.5$, $0 \le c \le 0.5$, $0 \le d \le 0.1$, and $a+b+c+d=1$), $Li(Li_eM^2_{f-e-f'}M^3_{f'})O_{2-g}A_g$ (where $0 \le e \le 0.2$, $0.6 \le f \le 1$, $0 \le f' \le 0.2$, and $0 \le g \le 0.2$, $M^2$ includes Mn and one or more selected from the group consisting of Ni, Co, Fe, Cr, V, Cu, Zn and Ti, $M^3$ includes one or more selected from the group consisting of Al, Mg and B, and A includes one or more selected from the group consisting of P, F, S and N); a lithium manganese oxide such as $Li_{1+h}Mn_{2-h}O_4$ ($0 \le h \le 0.33$), $LiMnO_3$, $LiMn_2O_3$, or $LiMnO_2$; a lithium copper oxide ($Li_2CuO_2$); a vanadium oxide such as $LiV_3O_8$, $V_2O_5$, or $Cu_2V_2O_7$; a Ni-site lithium nickel oxide represented by $LiNi_{1-i}M^4_iO_2$ (where $M^4$ is Co, Mn, Al, Cu, Fe, Mg, B or Ga, and $0.01 \le i \le 0.3$); a lithium manganese composite oxide represented by $LiMn_{2-j}M^5_jO_2$ (where $M^5$ is Co, Ni, Fe, Cr, Zn, or Ta, and $0.01 \le j \le 0.1$) or $Li_2Mn_3M^6O_8$ (where $M^6$ is Fe, Co, Ni, Cu, or Zn); $LiMn_2O_4$ in which some Li ions are substituted with alkaline earth metal ions; a disulfide compound; $LiFe_3O_4$, $Fe_2(MoO_4)_3$, or the like, but the present invention is not limited thereto.

As a solvent for forming the positive electrode, an organic solvent such as N-methyl pyrrolidone (NMP), dimethyl formamide (DMF), acetone, or dimethyl acetamide, water, or the like may be used, and these solvents may be used alone or a mixture of two or more of these materials may be used. The solvent may be used in an amount sufficient to dissolve and disperse the positive electrode active material, the binder, and the conducting agent in consideration of the thickness of the coated slurry and manufacturing yield.

Various kinds of binder polymers may be used as the binder, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid, a polymer in which hydrogen thereof is substituted with Li, Na, or Ca, and various copolymers.

The conducting agent is not particularly limited as long as it has conductivity without causing chemical changes in the battery, and for example, graphite such as natural graphite or artificial graphite; a carbon black type such as acetylene black, Ketjen black, channel black, furnace black, lamp black or thermal black; a conductive fiber such as a carbon fiber or a metal fiber; a conductive tube such as a carbon nanotube; a metal powder such as fluorocarbon powder, aluminum powder or nickel powder; a conductive whisker consisting of zinc oxide or potassium titanate; a conductive metal oxide such as titanium oxide; or a conductive material such as a polyphenylene derivative may be used. The conducting agent may be used in an amount of 1 wt % to 20 wt % based on the total weight of the positive electrode slurry.

As the dispersant, an aqueous dispersant or an organic dispersant such as N-methyl-2-pyrrolidone may be used.

Further, as the separator, a conventional porous polymer film conventionally used as a separator, for example, a porous polymer film made of a polyolefin-based polymer, such as an ethylene homopolymer, a propylene homopolymer, an ethylene/butene copolymer, an ethylene/hexene copolymer or an ethylene/methacrylate copolymer, or a stacked structure with two or more layers thereof may be used. Alternatively, a conventional porous non-woven fabric, for example, a non-woven fabric formed of a glass fiber with a high melting point or a polyethylene terephthalate fiber may be used, but the present invention is not limited thereto.

A lithium salt that may be included as an electrolyte used in the present invention may be, without limitation, any lithium salt commonly used in an electrolyte for a lithium secondary battery, and anions of the lithium salt may be, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

As the electrolyte used in the present invention, an organic liquid electrolyte, an inorganic liquid electrolyte, a solid polymer electrolyte, a gel polymer electrolyte, a solid inorganic electrolyte, or a melt-type inorganic electrolyte, which can be used in the production of a lithium secondary battery, may be used, but the present invention is not limited thereto.

The exterior of the lithium secondary battery of the present invention is not particularly limited, but may have a cylindrical shape using a can, a prismatic shape, a pouch shape, or a coin shape.

The lithium secondary battery according to the present invention may not only be used in a battery cell used as a power source for small devices, but may also be used as a unit battery in medium- to large-sized battery modules including a plurality of battery cells.

Exemplary examples of the medium-to-large-sized devices may include electric vehicles, hybrid electric vehicles, plug-in hybrid electric vehicles, systems for power storage, or the like, but the present invention is not limited thereto.

EXAMPLES

Hereinafter, the present invention will be described in further detail with reference to the following examples and experimental examples for illustrative purposes only, but these examples and experimental examples are not intended to limit the present invention. The examples according to the present invention can be modified into many different forms, and the scope of the present invention should not be construed as being limited to the examples described below. The examples of the present invention are provided to more completely explain the present invention to those of ordinary skill in the art.

Example 1

Silicon monoxide (SiO) having an average particle size ($D_{50}$) of about 5 μm was introduced into a tube furnace having a tube shape and subjected to CVD treatment under a mixed gas of argon (Ar) and methane ($CH_4$) to prepare silicon-based particles on which a carbon coating layer (first coating layer) is formed.

A polymer solution was prepared by dissolving a polyacrylic acid polymer having a weight average molecular weight (Mw) of 1,250,000 in water, and the silicon-based particles on which the carbon coating layer is formed were immersed in the polymer solution and sufficiently stirred using a stirrer. A silicon-based particle-carbon coating layer-polymer coating composite was obtained by filtering the solution through a filtering process and drying the filtride. Thereafter, the dried silicon-based particle-carbon coating layer-polymer coating composite was heat-treated at 800° C. for 3 hours under Ar gas to perform a carbonization reaction, thereby preparing particles in the form of a silicon-based particle-carbon coating layer (first coating layer)-carbonized polymer coating layer (second coating layer).

Subsequently, the particles and the $Li_2O$ powder were uniformly mixed in a mortar. The mixed powder was introduced into a tube furnace and heat-treated at a constant temperature (800° C.) while supplying argon gas and cooled to finally prepare particles (negative electrode active material) in the form of a silicon-based particle-carbon coating layer-carbonized polymer Li-doped coating layer. In the negative electrode active material, based on the total weight of the negative electrode active material, the carbon content of the first coating layer was 2.5 wt % and the carbon content of the second coating layer was 5 wt %.

In the negative electrode active material, Li was doped into the second coating layer in an amount of 1 wt % based on the total weight of the negative electrode active material.

Example 2

A negative electrode active material was prepared in the same manner as in Example 1, except that Li was doped into the second coating layer in an amount of 0.02 wt % based on the total weight of the negative electrode active material.

Example 3

A negative electrode active material was prepared in the same manner as in Example 1, except that Li was doped into the second coating layer in an amount of 4 wt % based on the total weight of the negative electrode active material.

Example 4

A negative electrode active material was prepared in the same manner as in Example 1, except that in the negative electrode active material, the second coating layer was formed at 8 wt % with respect to the total weight of the negative electrode active material.

Comparative Example 1

Silicon monoxide (SiO) having an average particle size ($D_{50}$) of about 5 μm was introduced into a tube furnace having a tube shape and subjected to CVD treatment under a mixed gas of argon (Ar) and methane ($CH_4$) to prepare silicon-based particles on which a carbon coating layer having a carbon content of about 7.5 wt % is formed.

Comparative Example 2

A polymer solution was prepared by dissolving a polyacrylic acid polymer having a weight average molecular weight (Mw) of 1,250,000 in water, and silicon monoxide (SiO) particles having an average particle size ($D_{50}$) of about 5 μm were immersed in the polymer solution and sufficiently stirred using a stirrer. A silicon-based particle-polymer coating composite was obtained by filtering the solution through a filtering process and drying the filtride. Thereafter, the dried silicon-based particle-polymer coating composite was heat-treated at 800° C. for 3 hours to proceed a carbonization reaction, thereby preparing particles in the form of a silicon-based particle-carbonized polymer coating layer. The carbon content of the prepared particles was about 7.5 wt %.

Comparative Example 3

Particles in the form of a silicon-based particle-N-containing carbonized polymer coating layer were prepared in the same manner as in Comparative Example 2, except that a polyurea polymer was dissolved in an alcohol-based solvent instead of dissolving the polyacrylic acid polymer in water. The carbon content of the prepared particles was about 7.5 wt %.

<Manufacture of Negative Electrode and Lithium Secondary Battery>

Examples 1A to 4A

The negative electrode active material prepared in Example 1, carbon black as a conducting agent, and polyacrylic acid (PAA) as a binder were mixed together with water ($H_2O$) as a solvent at a weight ratio of 80:10:10 to prepare a homogeneous negative electrode slurry. The prepared negative electrode slurry was coated on one surface of a copper current collector, dried, rolled and punched to a regular size, thereby manufacturing a negative electrode.

A coin-type half-cell of Example 1A was manufactured by interposing a polyolefin separator between the negative electrode and a Li metal as a counter electrode, and injecting an electrolyte in which 1M $LiPF_6$ was dissolved in a solvent in which ethylene carbonate (EC) and ethyl methyl carbonate (EMC) were mixed in a volume ratio of 30:70.

Coin-type half-cells of Examples 2A to 4A were manufactured in the same manner as in Example 1A, except that the negative electrode active materials of Examples 2 to 4 were used, respectively, instead of using the negative electrode active material of Example 1.

Comparative Examples 1A to 3A

Negative electrodes and coin-type half-cells of Comparative Examples 1A to 3A were manufactured in the same manner as in Example 1A, except that the negative electrode active materials of Comparative Examples 1 to 3 were used, respectively, as the negative electrode active material.

Experimental Example 1: Measurement of Electrical Conductivity

Three Grams of Each of the Particles Prepared in Each of Examples 1 to 4 and Comparative Examples 1 to 3 was dispensed and placed in a holder as a negative electrode active material. Using an electrical conductivity measuring device (HPRM-100 MS, manufactured by Hantech, Inc.), the holder was placed in a 4-probe and then the resistance according to the pressure was measured by applying a constant pressure (400 kgf).

The electrical conductivity of Table 1 below shows the relative electrical conductivity of each of Examples 1 to 4 and Comparative Examples 1 to 3 based on the electrical conductivity of Comparative Example 1 (100%) when the pressure of 400 kgf was applied.

TABLE 1

|  | Electrical conductivity (%) |
| --- | --- |
| Example 1 | 125 |
| Example 2 | 105 |
| Example 3 | 142 |
| Example 4 | 134 |
| Comparative Example 1 | 100 |
| Comparative Example 2 | 10 |
| Comparative Example 3 | 55 |

In the case of Examples 1 to 4, since the first coating layer was formed on the silicon-based core (SiO), and the second coating layer manufactured by carbonizing a polymer positioned on the first coating layer includes doped lithium, it was evaluated to have excellent electrical conductivity compared to Comparative Examples 1 to 3.

Experimental Example 2: Evaluation of Capacity Retention Rate and Electrode Thickness Change Rate The batteries manufactured in Examples 1A to 4A and Comparative Examples 1A to 3A were charged and discharged to evaluate a capacity retention rate and an electrode thickness change rate, and the results are shown in Table 2 below.

Each of the batteries manufactured in Examples 1A to 4A and Comparative Examples 1A to 3A was charged at 25° C. and a constant current (CC) of 0.1 C up to 5 mV, and then first charging was performed at a constant voltage (CV) up to a charge current of 0.005 C (cut-off current). Thereafter, the battery was maintained for 20 minutes, and then first discharging was performed by discharging the battery at a constant current (CC) of 0.1 C until 1.5 V. Then, the charging and discharging were repeated at 0.5 C up to 40 cycles to evaluate the capacity retention rate. After the cycle test was completed, the 41st cycle was terminated in a charged state, and the battery was disassembled and the thickness of the negative electrode was measured, and then the thickness increase of the negative electrode was calculated as the percentage of the thickness of the negative electrode after the 41th cycle based on the thickness of the negative electrode immediately after the manufacturing process, which was expressed as the electrode thickness change rate.

TABLE 2

|  | Capacity retention rate (%) | Electrode thickness change rate (%) |
| --- | --- | --- |
| Example 1A | 58.9 | 46.3 |
| Example 2A | 56.1 | 48.3 |
| Example 3A | 56.9 | 47.5 |

TABLE 2-continued

|  | Capacity retention rate (%) | Electrode thickness change rate (%) |
| --- | --- | --- |
| Example 4A | 56.5 | 48.5 |
| Comparative Example 1A | 53.7 | 50.5 |
| Comparative Example 2A | 47.8 | 53.9 |
| Comparative Example 3A | 50.2 | 52.6 |

Referring to Table 2, it can be seen that in the case of the secondary batteries of Examples 1A to 4A, the capacity retention rate is improved and the electrode thickness change rate is smaller compared to those of Comparative Examples 1A to 3A.

In the case of Comparative Examples 1A to 3A, it is confirmed that the electrical conductivity of the active material is low, and the capacity retention rate is lower and the electrode thickness change rate is higher, compared to the Examples. In particular, in the case of Comparative Example 2A, the electrical conductivity of the active material is low such that resistance is greatly increased, and the carbon coating layer is not able to effectively suppress the change in thickness of the electrode, and thus performance in terms of electrode thickness change rate and capacity retention rate is deteriorated.

The invention claimed is:

1. A negative electrode active material comprising:
   a silicon-based core;
   a first coating layer positioned on the silicon-based core; and
   a second coating layer positioned on the first coating layer,
   wherein the second coating layer includes a metal material doped onto a surface of the second coating layer, and
   wherein the metal material is positioned on the surface of the second coating layer, which is opposite to a surface of the second coating layer which contacts with the first coating layer.

2. The negative electrode active material of claim 1, wherein the silicon-based core includes one or more selected from the group consisting of Si, a silicon oxide particle ($SiO_x$, $0 \leq x < 2$), and a mixture thereof.

3. The negative electrode active material of claim 2, wherein the silicon oxide particle ($SiO_x$, $0 \leq x < 2$) is a composite composed of amorphous $SiO_2$ and crystalline Si.

4. The negative electrode active material of claim 1, wherein an average particle size ($D_{50}$) of the silicon-based core is in a range of 0.01 μm to 30 μm.

5. The negative electrode active material of claim 1, wherein the first coating layer includes one or more selected from the group consisting of amorphous carbon, natural graphite, artificial graphite, activated carbon, mesocarbon microbeads (MCMB), carbon fiber, and a carbon-based material made by heat-treating coal tar pitch, petroleum pitch, and an organic material as raw materials.

6. The negative electrode active material of claim 1, wherein
   the second coating layer is formed by carbonizing a polymer, and
   the polymer includes one or more selected from the group consisting of polyethylene oxide, polyvinyl pyrrolidone, polyacrylic acid, polyvinyl alcohol, polyethyleneimine, polyacetylene, polyparaphenylene, polypyrrole, polyaniline, polyacrylonitrile, polyurea, and polythiophene.

7. The negative electrode active material of claim 1, wherein the metal material comprises one or more selected from the group consisting of Li, Mg, Ca, Al, Ti, and Na.

8. The negative electrode active material of claim 1, wherein the metal material is included in an amount of 0.01 parts by weight to 5 parts by weight based on 100 parts by weight of the negative electrode active material.

9. A negative electrode for a lithium secondary battery comprising the negative electrode active material of claim 1.

10. A lithium secondary battery comprising the negative electrode of claim 9.

11. A method of preparing the negative electrode active material of claim 1, the method comprising:
   forming a first coating layer on a silicon-based core;
   coating a polymer on the first coating layer to form a polymer layer and carbonizing the polymer layer to form a second coating layer; and
   doping a surface of the second coating layer with a metal material.

12. The method of claim 11, wherein the metal material is one or more selected from the group consisting of Li, Mg, Ca, Al, Ti, and Na.

* * * * *